United States Patent [19]

Massonne et al.

[11] 4,108,967
[45] * Aug. 22, 1978

[54] PROCESS FOR PREPARING SULPHUR HEXAFLUORIDE

[75] Inventors: Joachim Massonne, Hanover; Wilfried Becher, Heilbronn-Neckargartach, both of Fed. Rep. of Germany

[73] Assignee: Kali-Chemie Aktiengesellschaft, Hanover, Fed. Rep. of Germany

[ * ] Notice: The portion of the term of this patent subsequent to Aug. 2, 1994, has been disclaimed.

[21] Appl. No.: 806,674

[22] Filed: Jun. 15, 1977

Related U.S. Application Data

[62] Division of Ser. No. 550,159, Feb. 14, 1975, Pat. No. 4,039,646.

[30] Foreign Application Priority Data

Feb. 16, 1974 [DE] Fed. Rep. of Germany ....... 2407492

[51] Int. Cl.² .......................................... C01B 17/45

[52] U.S. Cl. ............................. 423/469; 423/DIG. 12
[58] Field of Search ........ 423/469, 467, 468, DIG. 12

[56] References Cited

U.S. PATENT DOCUMENTS 4,039,646   8/1977   Massonne et al. ................... 423/469

Primary Examiner—Edward Stern
Attorney, Agent, or Firm—Bacon & Thomas

[57] ABSTRACT

Disclosed is a process for the production of sulphur hexafluoride comprising the steps of reacting fluorine and molten sulphur, removing lower-boiling by-products, separating a portion of the sulphur hexafluoride from higher-boiling by-products and treating the residue containing the higher-boiling by-products at a temperature between about 450° and 800° C. for a period of time between about 0.1 and 25 seconds. The treatment step may be carried out in the presence of elementary fluorine, and provision may be made for recycling the treated or untreated residue to the reaction stage. An apparatus for carrying out the process is also disclosed.

9 Claims, 2 Drawing Figures

PROCESS FOR PREPARING SULPHUR HEXAFLUORIDE

This is a division of application Ser. No. 550,159 filed Feb. 14, 1975, now U.S. Pat. No. 4,039,646.

BACKGROUND OF THE INVENTION

The present invention relates to the preparation of sulphur hexafluoride, and more especially, to an improved process and apparatus for the production of sulphur hexafluoride from elementary fluorine and sulphur, with the improvement comprising the elimination and/or recycle of the higher-boiling by-products produced during industrial production processes of this type.

The industrial production of sulphur hexafluoride is carried out by means of a reaction of elementary fluorine with molten sulphur. The elementary fluorine is produced by electrolysis of hydrogen fluoride, and always contains — dependent upon the process of production — impurities of hydrogen fluoride, oxygen, nitrogen as well as perfluorinated alkanes and cycloalkanes. Furthermore, depending upon trace impurities of the hydrogen fluoride, the fluorine may also contain, for example, the compounds $OF_2$ (from $H_2O$) and $ClO_3F$ (from chlorine compounds).

In addition to lower sulphur fluorides such as $S_2F_2$, $SF_4$ and $S_2F_{10}$, the sulphur hexafluoride produced by the reaction of fluorine with molten sulphur can also contain a number of further impurities, for example, $SF_5OSF_6$; $SF_5OCF_3$; $SOF_2$; $SOF_4$; $SO_2F_2$; $C_nF_{2n+2}$; $C_nF_{2n}$; $ClO_3F$ as well as oxygen $O_2$ and nitrogen $N_2$. The raw sulphur hexafluoride $SF_6$ so produced must therefore be purified, in order to fulfill the stringent purity requirements which apply to the use of $SF_6$ as an insulating and quenching gas.

Normally, the highly toxic $S_2F_{10}$ is removed from the product by means of a down-stream temperature treatment at a temperature of approximately 400° C, in accordance with the equation:

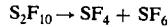

$$S_2F_{10} \rightarrow SF_4 + SF_6$$

Similarly, hydrolyzable compounds such as $SF_4$, $S_2F_2$, $SOF_2$, $SOF_4$ and $SO_2F_2$ are removed by means of a subsequently carried out alkali wash and/or alkali absorption step.

Finally, the lower-boiling components such as $O_2$, $N_2$ and $CF_4$ are removed, for example, by being stripped in a first stage of a two-stage pressure distillation step, and the higher-boiling components are concentrated in the column sump of the second distillation stage.

This column sump represents a mixture of different materials and contains, in addition to the principal component $SF_6$, the higher-boiling impurities, especially $SF_5OSF_5$, $CF_3OSF_5$, $ClO_3F$, perfluorinated alkanes and cycloalkanes. Several of these materials are highly toxic. There exists also the possibility that, in the case of any failure or trouble, e.g., with loss of the temperature treatment or as a result of incomplete washing, other materials may also pass into the column sump, which normally are removed in the upstream purification stages.

The column sump composition is thus a natural waste product, the emptying and storage of which is fraught with risks. As a result of the heterogeneous composition of the waste product, chemical destruction to safe products is problematic, difficult and expensive.

SUMMARY OF THE INVENTION

It is therefore an object of the present invention to provide an improved process for the production of sulphur hexafluoride.

It is a further object of the invention to provide an improved process for the production of sulphur hexafluoride wherein the $SF_6$ waste material containing higher-boiling impurities is safely and easily disposed of.

A further object of the invention resides in the provision of an improved process for the production of $SF_6$ wherein the higher-boiling impurity-containing $SF_6$ is recycled to the reaction step to increase the yield of $SF_6$ and decrease the production of by-products.

Another object of the invention resides in the provision of an apparatus for carrying out the improved process of the invention.

In accomplishing the foregoing objects, there has been provided, in accordance with the present invention, an improved process for the production of sulphur hexafluoride $SF_6$ comprising the steps of reacting fluorine and molten sulphur, whereby a mixture of $SF_6$ with higher- and lower-boiling by-products is produced, removing the lower-boiling by-products from the mixture, separating a portion of the $SF_6$ from the higher-boiling by-products, whereby a residue of $SF_6$ containing a minor proportion of higher-boiling by-products results, and treating the residue at a temperature between about 450° and 800° C., preferably between about 500° and 650° C., for a period of time between about 0.1 and 25 seconds, preferably between about 0.5 and 5 seconds, optionally in the presence of elementary fluorine. The process may further include the step of contacting the thus-treated residue with an aqueous alkali solution to remove fluoro-sulphur compounds, and advantageously, the treated residue may be recycled back to the reaction step, preferably introducing same into a supply conduit for fluorine to the reaction. Recycling may be carried out continuously or intermittently, i.e., batchwise.

Typically, the step of separating a portion of the $SF_6$ from the higher-boiling by-products comprises a distillation step producing the residue as a bottoms-product, and in this case the process is further characterized by the step of vaporizing the bottoms-product prior to carrying out the described treatment step.

In another aspect of the present invention, there is provided a process which includes a step of recycling the residue directly back to the reaction step, whereby the treating step is carried out concurrently with the reaction step. Where this direct recycle is carried out, the process also inherently includes the step of contacting the temperature-treated residue with an aqueous alkali solution, by virtue of the fact that the temperature-treated residue passes into an aqueous alkali solution contact step subsequent to the reaction step.

In a further aspect of the invention, there has been provided an apparatus for the production of sulphur hexafluoride $SF_6$ from fluorine and molten sulphur, comprising:

(a) a vessel for reacting fluorine and molten sulphur, wherein a mixture of $SF_6$ together with higher- and lower-boiling by-products is produced;

(b) means such as an alkali wash and/or pressure still after the reaction vessel for removing the lower-boiling by-products from the mixture;

(c) means such as a pressure distillation apparatus connected with the above apparatus for separating a portion of the $SF_6$ from the higher-boiling by-products, wherein a residue of $SF_6$ containing a minor proportion of higher-boiling by-products is produced; and (d) means such as a heated chamber or a recycle back to the reaction vessel for treating the residue at a temperature between about 450° and 800° C.

Further objects, features and advantages of the present invention will become apparent from the following detailed description of several specific embodiments, when considered together with the accompanying figures of drawing.

DETAILED DESCRIPTION OF SPECIFIC EMBODIMENTS

In accordance with the present invention, there has been discovered a process which permits a batchwise or continuous working up of the column sump to eliminate non-toxic and easily separable components. In a preferred embodiment of the invention, the working up of the sump material is carried out in connection with the sulphur hexafluoride production process by recycling the sump into the reaction and/or purification part of the process.

It has been discovered, in particular, that a treatment of the sump at a temperature greater than 400° C, typically between about 450° and 800° C, and preferably between about 500° and 650° C, decomposes the $SF_5OSF_5$, $CF_3OSF_5$ and $ClO_3F$ impurities, whereas the principal component $SF_6$ is still not, or only to a small degree, affected at these temperatures. Some of the higher fluorocarbon compounds, such as, perfluoromethylcyclopentane, are partially decomposed, and other fluorocarbons, such as perfluoronated-N-alkanes, remain largely unaffected. Any $S_2F_{10}$ present is decomposed already at temperatures of 400° C, as is known.

If the gaseous product coming from the temperature treatment step is washed with an alkali solution, e.g., potash lye, it will not contain any more fluoro-sulphur compounds other than $SF_6$ and some fluorocarbon compounds.

It has also been discovered that the higher molecular weight fluorocarbon compounds are largely broken down into lower compounds, predominantly into $CF_4$, by the addition of elementary fluorine during the temperature treating step using a volumetric relationship of 0.1 to 2 parts of the residue respectively therefor to 1 part of fluorine and preferably 1 part residue to 1 part fluorine.

At the same time, the sulphur-containing products are fluorinated to $SF_6$. Such a decomposition is also observed if the temperature treatment step is carried out without and with elementary fluorine, respectively, in two reactors connected in series.

A considerable decrease in the proportion of higher-boiling fluoro-sulphur compounds and $ClO_3F$ as well as of the proportion of higher-boiling perfluorinated alkanes and cycloalkanes in the column sump can also be accomplished by vaporizing the bottoms product of the column and adding the gas mixture to the fluorine supply conduit which leads to the $SF_6$ reactor. Under the reaction conditions of the $SF_6$ synthesis, in connection with which temperatures of greater than 450° C. occur in the gas phase, obviously reactions take place in the same way as those which are achieved by a combination of temperature treatment without and with fluorine.

Figure 1:
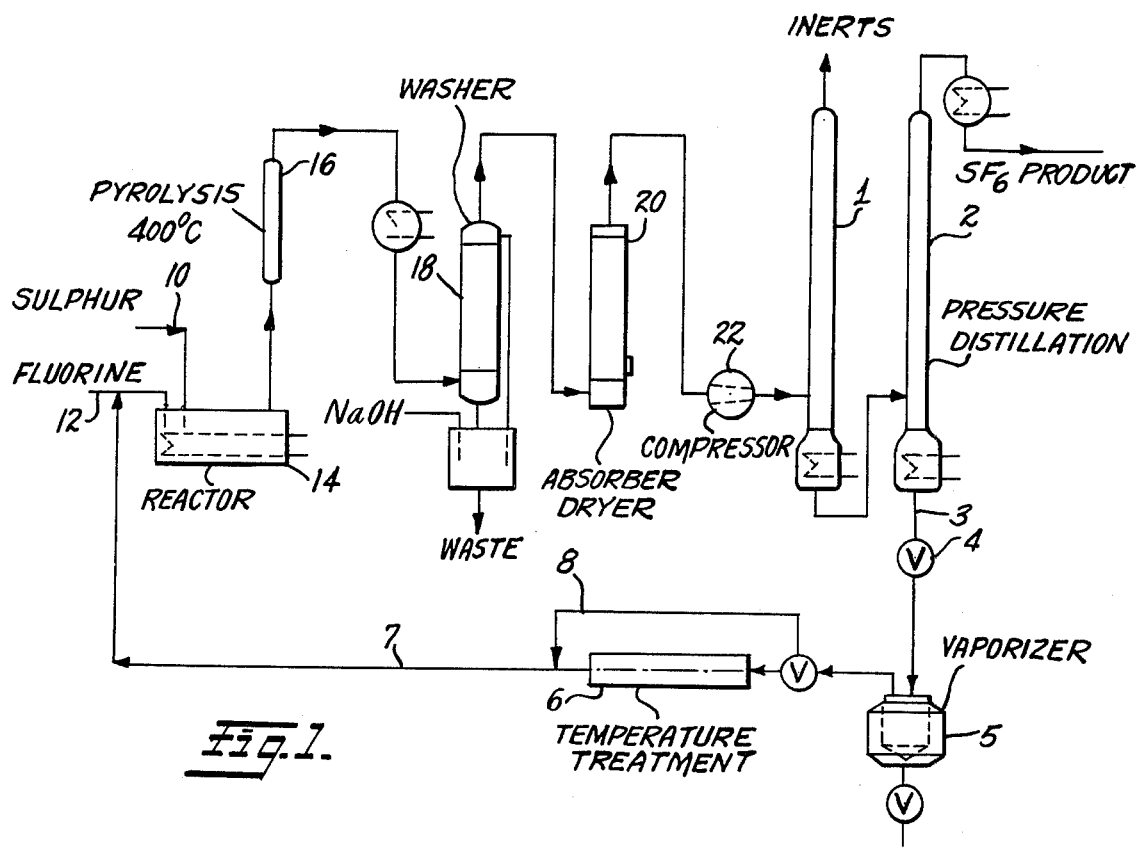
FIG. 1 is a schematic diagram of an apparatus suitable for carrying out the process of the invention.

A preferred industrial embodiment of the process is represented with reference to the schematic process illustration of a $SF_6$ facility such as disclosed in Chemiker Zeitung, 96, (1972), page 73, which is shown in FIG. 1 of the drawings. The $SF_6$ production process operates in conventional manner, wherein molten sulphur is introduced via a supply line 10 and elementary fluorine via supply line 12 into the reaction vessel 14. The gaseous reaction product is removed from the reaction vessel and conveyed to a pyrolysis vessel 16 wherein temperatures of 400° C. or more are produced in order to remove $S_2F_{10}$. After pyrolysis, the gaseous mixture is conveyed to a washing device 18 where it is contacted with an aqueous alkali solution, such as NaOH. Upon leaving the washing step, and after having been dried in absorption-drying unit 20, the gaseous mixture is compressed by compressor 22 and introduced into a 2-stage compression distillation stage carried out in the two distillation columns identified with reference numerals 1 and 2. Column 1 is a stripper column wherein lower-boiling, and inert gases such as $O_2$, $N_2$ and $CF_4$ are removed. Substantially pure $SF_6$ is removed from the top of column 2, whereas the higher-boiling impurities are concentrated in the sump of this column.

In accordance with the improved process of the present invention, the bottoms product of column 2 is continuously released via the line 3 and the dosing valve 4. After passing through the vaporizer 5, the gases are fed through the temperature treating device 6 and finally via line 7 into the fluorine supply line 12 which leads to reactor 14 in the $SF_6$ facility.

By virtue of this method of operation, the result is achieved that the $SF_6$ contained in the column sump is not lost, that the hydrolyzable decomposition products obtained in the temperature treatment stage are separated together with the hydrolyzable products produced in the $SF_6$ synthesis in the washing device of the $SF_6$ production apparatus or are fluorinated to $SF_6$, and that finally, a substantial fluorination of the perfluorinated alkanes and cycloalkanes into $CF_4$ also results. The $CF_4$ together with the $CF_4$ present in the $F_2$, is separated in the stripper column 1 of the pressure distillation stage.

A further industrial embodiment of the process involves the direct recycle of the gaseous bottoms product exiting from the vaporizer 5 back to the fluorine feed stream entering reactor 14, i.e., without previous temperature treatment. This embodiment of the invention can be carried out with the apparatus illustrated in FIG. 1 by providing a by-pass line 8 around the temperature treatment chamber 6.

Both embodiments of the process guarantee that the proportion of higher-boiling products present in the sump can be held at a low-level, that no difficulty separable and difficulty removable waste products are produced and that no loss of $SF_6$ can take place.

Figure 2:
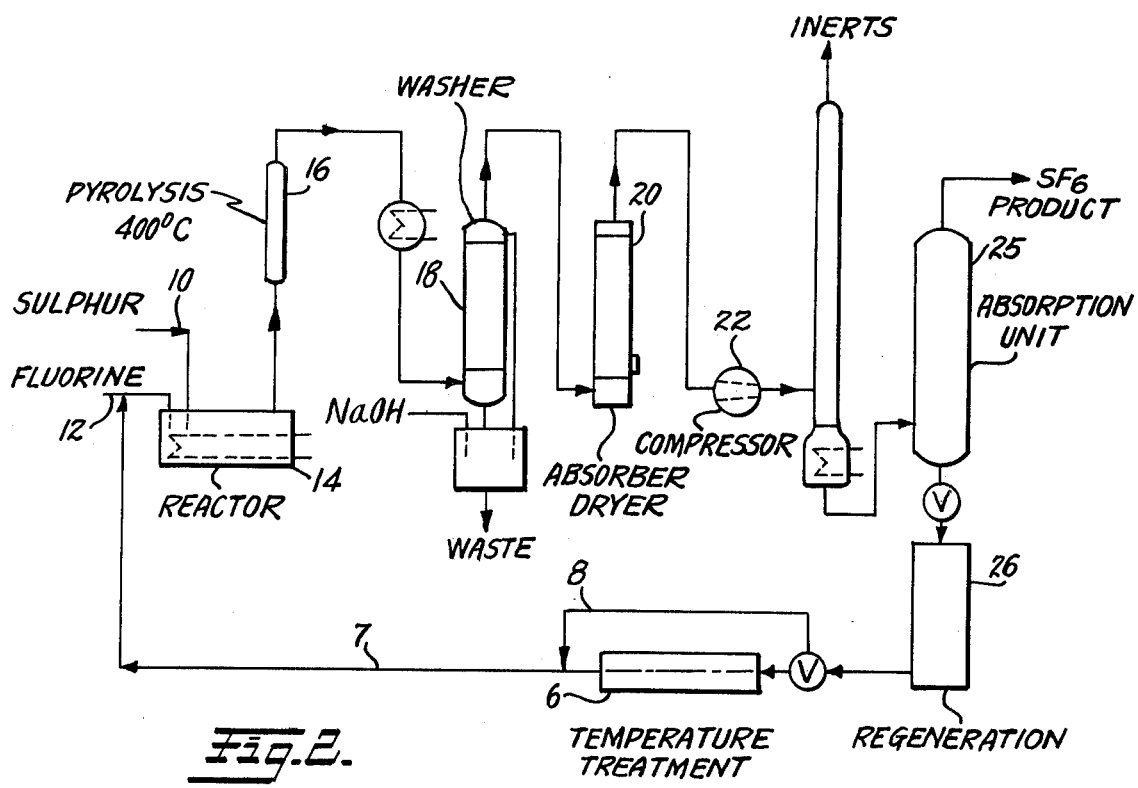
FIG. 2 is a schematic diagram of a modified apparatus in accordance with the invention.

It is also known that the possibility exists to separate the higher-boiling fraction present in the $SF_6$ by treatment of the impure $SF_6$ with absorbents, such as, for example, activated carbon or molecular sieves, instead of a pressure distillation technique. When the absorbents are regenerated, which normally is accomplished by heating, this high-boiling fraction together with the concurrently absorbed $SF_6$ is set free. In an alternative embodiment of the present invention, the $SF_6$ production process can be carried out utilizing such an absorption stage, and the steps provided according to the invention for treating and removing the mixture of impurities may be carried out in conjunction with such a modified process. The apparatus for carrying out this alternative embodiment is illustrated in FIG. 2 of the drawings wherein an absorption unit 25 is provided in the chain of apparatus in place of the second distillation column 2 in FIG. 1. The absorbent from the absorption unit is regenerated in a regeneration stage 26 provided in the recycle loop to the reactor 14, which recycle loop contains temperature treatment chamber 6.

The treated gas mixture may be washed with alkali solutions of various bases and concentrations. Preferably a 5 to 10 percent solution of potassium hydroxide is used in order to avoid precipitates and muds.

The following examples are presented to more fully describe the present invention, it being understood that the examples are intended to be merely illustrative and in no sense limitative.

EXAMPLE 1

A gas sample from the distillation sump of a $SF_6$ production unit is conducted at a temperature of 600° C. through a stainless steel tube having an inside diameter of 15 mm. and a length of 1200 mm. The tube is provided with an electrical heating coil having a length of approximately 1000 mm.

The gaseous sample from the distillation column has the following composition as determined by gas chromatography and infrared spectroscopy (in percentage of area of the gas chromatogram):

Peak 1—$SF_6$: 76.2%
Peak 2—i-$C_4F_{10}$; n-$C_4F_{10}$; $CF_3.O.SF_5$: 3.6%
Peak 3—$ClO_3F$; n-$C_5F_{12}$: 0.5%
Peak 4—$C_5F_{10}$ (Perfluorocyclopentane): 8.4%
Peak 5—$SF_5.O.SF_5$; n-$C_6F_{14}$: 6.7%
Peak 6—$C_5F_9$-$CF_3$ (Perfluoromethylcyclopentane); $S_2F_{10}$: 3.4%
Peak 7—$C_6F_{12}$ (Perfluorocyclohexane): 1.1%
Peak 8—Higher perfluoronated hydrocarbon compounds: 0.2%

A gas residence time of 40 seconds is chosen. The gas composition which is subjected to the temperature treatment is conducted through a 10% potash lye solution and is thereafter led through a gas receiver from which samples are taken for analysis.

The gas chromatogram shows a reduction in the area of peaks 2, 3, 5 and 6. The IR analysis results in a finding that the compounds $CF_3OSF_5$; $ClO_3F$; $SF_5OSF_5$ and $S_2F_{10}$ are no longer detectable.

EXAMPLE 2

A distillation bottoms product having the composition specified in example 1 is subjected to a temperature treatment at 500° C. with a residence time of 100 seconds under otherwise similar conditions. The results of the analysis are the same as in example 1, with the exception that the treated gas still contains approximately 10% of the initial concentration of the component $SF_5OSF_5$.

EXAMPLE 3

A sample of the distillation bottoms product used in Example 1 is treated in admixture with fluorine in a volumetric relationship of 1:1 at a temperature of 500° C. and with a residence time of 10 seconds. Thereafter, the sample is diluted with nitrogen and the resulting mixture is directed into a thoroughly cooled washing flask with a 10% aqueous potash lye solution. The non-hydrolyzable gases are collected in a gasometer and analyzed.

In addition to $N_2$ and $SF_6$, $CF_4$, $C_2F_6$, $SO_2F_2$ and $O_2$ (from the reaction of fluorine with potash lye) are detected.

EXAMPLE 4

In a device, which is installed in a $SF_6$ production unit and which is schematically illustrated in FIG. 1 of the drawings, liquid in an amount of 1 kg/hr is withdrawn via a dosing valve from the still bottom of a $SF_6$ distillation column and is expanded to a pressure of about 1 bar. After passing through a vaporizer, which is maintained at a temperature of 100° C., the now gaseous material passes through a tube of stainless steel (inside diameter: 30 mm., heated length: 1500 mm.). The gas treated in this manner is recycled into the fluorine supply line, shortly before its entrance into the reactor. The conditions chosen correspond to a gas residence time of around 24 seconds.

During the operation of the device for the temperature treatment, samples are taken from the bottom of the distillation column at regular intervals for analysis. The results of the analysis show a steady reduction of the concentration of the total content of higher-boiling by-products. Parallel to this finding is a finding that an increased content of $CF_4$ is found in the inert gases withdrawn at the top of the first distillation column.

During the duration of the experiment, there resulted a steady, but varied decrease in the concentration of the individual components in the bottoms product of the distillation column, and in this regard the concentration of the sulphur-containing compounds decreases to a greater extent. Thus, for example, a $C_5F_{10}$ content of 5.73% decreased in the course of several hours to only 4.99%, whereas the content of $SF_5OSF_5$ decreased from 1.36% to 0.02%.

EXAMPLE 5

From the bottom of the distillation column in a $SF_6$ production unit, approximately 2 kg/hr of the bottoms product is removed via a dosing valve and expanded to a pressure of about 1 bar. The gas mixture obtained as a result is introduced into the fluorine supply line prior to the sulphur reactor. In this manner, the gas is brought into contact with fluorine in the reactor, where it is partially converted, and then the gas continues on over the wash system and into the distillation columns.

Based upon the analysis samples, which are removed from the bottom of the distillation column at regular intervals of time, there is evidenced a progressive decrease in the concentration of all components, of which the sulphur-containing compounds are above all affected.

Already after several hours of operating the recycle, the proportion of sulphur-containing compounds in the distillation sump is reduced by 50–90% of the initial content.

What is claimed is:

1. In a process for the production of sulphur hexafluoride $SF_6$ including the steps of reacting fluorine and molten sulphur, whereby a mixture of $SF_6$ together with higher- and lower-boiling by-products is produced, removing said lower-boiling by-products from said mixture, and separating a portion of said $SF_6$ from said higher boiling by products, whereby a residue of said $SF_6$ containing a minor portion of higher-boiling by-products results, the improvement comprising the step of recycling said residue back to said reacting step.

2. The process as defined in claim 1 wherein prior to said recycling step, said residue is treated by pyrolyzing in the presence of 1 part elementary fluorine for each 0.1 to 2 parts residue.

3. The process as defined by claim 1, further comprising the step of pyrolyzing said residue at a temperature between about 450° and 800° C for a period of time between about 0.1 and 100 seconds before recycling said residue back to said reacting step.

4. The process as defined by claim 1, wherein said treating step is in the presence of one part of said residue to one part of said fluorine.

5. The process as defined by claim 1, further comprising the step of contacting said treated residue with an aqueous alkali solution, whereby fluoro-sulphur compounds are removed from said product.

6. The process as defined by claim 1, wherein said treating step is carried out at a temperature between about 500° and 650° C.

7. The process as defined by claim 1, wherein said treating step is carried out for a period of between about 0.5 and 5 seconds.

8. The process as defined by claim 1, wherein said treated residue is recycled continuously to said reaction step.

9. The process as defined by claim 1, wherein said treated residue is recycled intermittently to said reaction step.

* * * * *